United States Patent [19]

Sabin

[11] Patent Number: 5,664,888
[45] Date of Patent: Sep. 9, 1997

[54] ZERO CLEARANCE BEARING

[75] Inventor: Jeffrey M. Sabin, Lewiston, N.Y.

[73] Assignee: Leica Inc., Depew, N.Y.

[21] Appl. No.: 767,520

[22] Filed: Dec. 26, 1996

Related U.S. Application Data

[63] Continuation of Ser. No. 500,482, Jul. 10, 1995, abandoned.

[51] Int. Cl.[6] ........................ F16C 17/03
[52] U.S. Cl. ................ 384/10; 384/117; 384/119; 384/125
[58] Field of Search ............... 384/10, 117, 119, 384/125, 116, 122, 312, 309

[56] References Cited

U.S. PATENT DOCUMENTS

| | | | |
|---|---|---|---|
| 5,112,143 | 5/1992 | Ide | 384/119 |
| 5,222,815 | 6/1993 | Ide | 384/119 |
| 5,489,155 | 2/1996 | Ide | 384/119 |

*Primary Examiner*—Lenard A. Footland
*Attorney, Agent, or Firm*—Bean, Kauffman & Snyder

[57] ABSTRACT

A bearing for supporting a load for axial and rotational motion relative to a shaft is disclosed as including an outer shell having a cylindrical inner wall supporting a plurality of circumferentially spaced arcuate bearing pads for engaging the shaft. Each bearing pad includes a pair of elastically deformable lateral tip portions arranged for interference fit with the shaft to exert a static preload on the shaft, and a mid portion intermediate the lateral tip portions arranged for clearance fit with the shaft. A plurality of lubricant channels communicate with the shaft through gaps between the separate bearing pads.

7 Claims, 2 Drawing Sheets

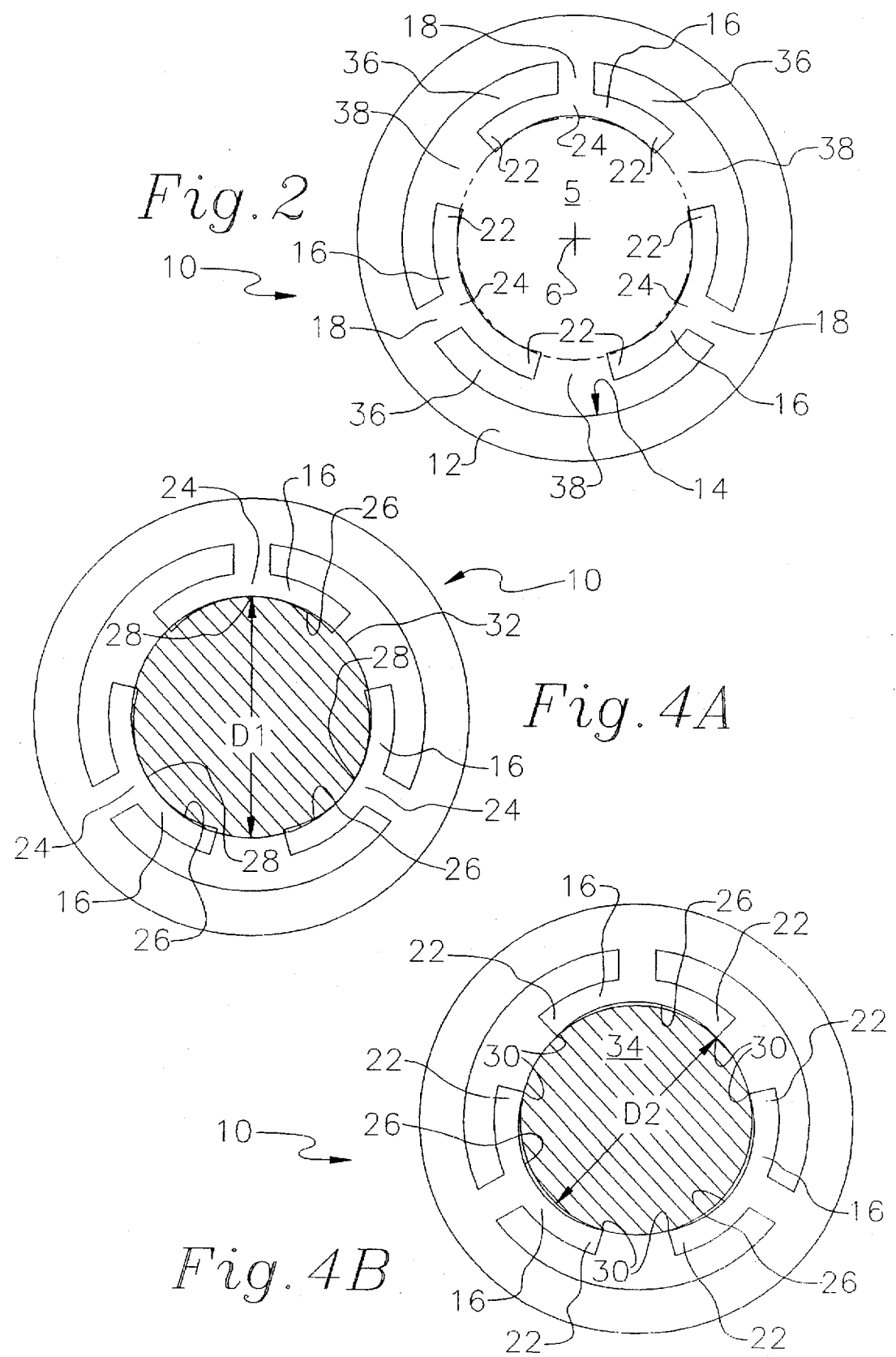

ZERO CLEARANCE BEARING

This application is a continuation of application Ser. No. 08/500,482, Jul. 10, 1995 now abandoned.

BACKGROUND OF THE INVENTION

A. Field of the Invention

The present invention relates generally to bearings for supporting a load for axial and rotational motion relative to a shaft, and more particularly to a bearing having a plurality of bearing pads designed to exert a static preload on the shaft to achieve a zero clearance fit between the shaft and bearing pads.

B. Description of the Prior Art

It is known in the prior art to provide bearings with circumferentially spaced bearing pads connected to an outer cylindrical shell which are designed to deflect and change shape under loading. For example, Patent Nos. 5,112,143 and 5,284,392 to Ide teach hydrodynamic bearing embodiments having bearing pads structured to move in any direction under loading to optimize formation of a converging hydrodynamic wedge, equalize loading on the bearing pads, and correct for any shaft misalignment. However, the bearing embodiments of Ide are generally concerned with problems associated with high rpm rotational shaft motion, and do not address problems associated with high precision linear (axial) motion.

Linear ball bearings specifically designed for high precision axial motion, such as those manufactured by Thomson Industries, Inc., are expensive. Less expensive standard sleeve bearings require a lapping operation with the shaft in order to achieve a "zero clearance fit" necessary for precision motion.

SUMMARY OF THE INVENTION

Therefore, it is an object of the present invention to provide a zero clearance bearing for supporting a load for precision axial and rotational motion relative to a shaft.

It is another object of the present invention to provide a bearing which is self-aligning relative to a shaft.

It is a further object to provide a bearing which will maintain zero clearance with a shaft despite wearing of the bearing over time.

It is a still further object to provide a bearing which is simple and economical to manufacture.

Briefly, a bearing formed in accordance with a preferred embodiment of the present invention includes an outer shell having a cylindrical inner wall, and a plurality of circumferentially spaced arcuate bearing pads connected to the inner wall by radially extending fingers for engaging a shaft. Each bearing pad includes a pair of elastically deformable lateral tip portions arranged for interference fit with the shaft to exert a static preload on the shaft, and a mid portion intermediate the lateral tip portions arranged for clearance fit with the shaft. A plurality of lubricant channels are defined by the fingers in cooperation with the inner wall of the shell to communicate with the shaft through gaps between the separate bearing pads.

BRIEF DESCRIPTION OF THE DRAWINGS

The nature and mode of operation of the present invention will now be more fully described in the following detailed description taken with the accompanying drawings wherein:

FIG. 2 is an end view of thereof showing a shaft in imaginary line to illustrate relative fit between bearing and shaft prior to receipt of the shaft by the bearing;

FIGS. 4A and, 4B are end views similar to that of FIG. 2 showing a pair of appropriately sized plug gauges for checking tolerance conformity.

DETAILED DESCRIPTION

Figure 1:
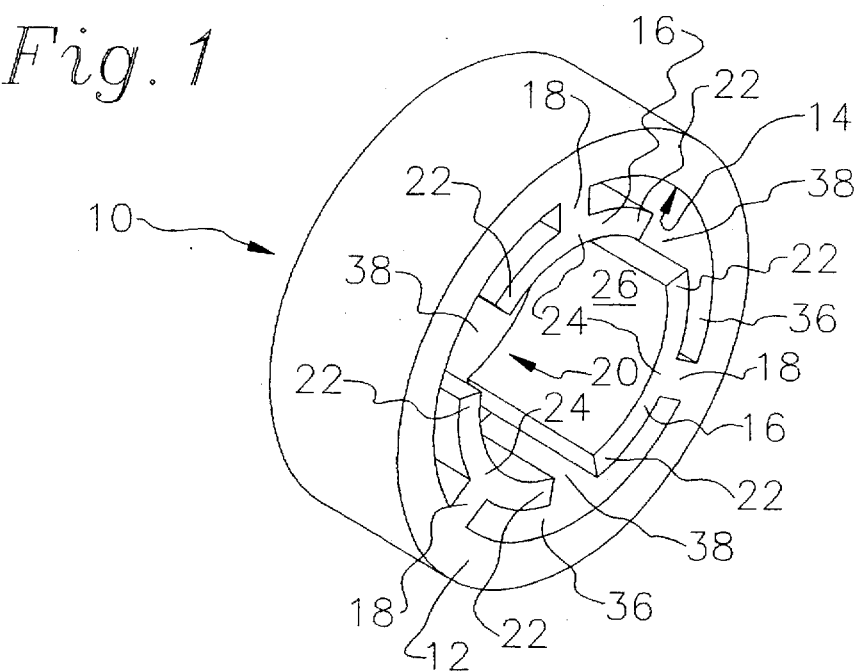
FIG. 1 is a perspective view of a bearing formed in accordance with the present invention.

There is depicted in FIG. 1 a bearing formed in accordance with the present invention and designated generally by the reference numeral 10. Bearing 10 comprises an outer shell 12 having a cylindrical inner wall 14 and a plurality of bearing pads 16 connected to the inner wall by respective fingers 18 in circumferentially spaced relationship to define a shaft opening 20.

Referring also now to FIG. 2, a cylindrical shaft 5 is indicated in phantom line and is intended for receipt within shaft opening 20. As will be understood, each of the bearing pads 16 includes a pair of lateral tip portions 22 arranged for interference fit with shaft 5, and a mid portion 24 intermediate tip portions 22 arranged for clearance fit with shaft 5. Fingers 18 extend between inner wall 14 and respective mid portions 24, such that tip portions 22 are cantilevered adjacent mid portions 24.

Figure 3:
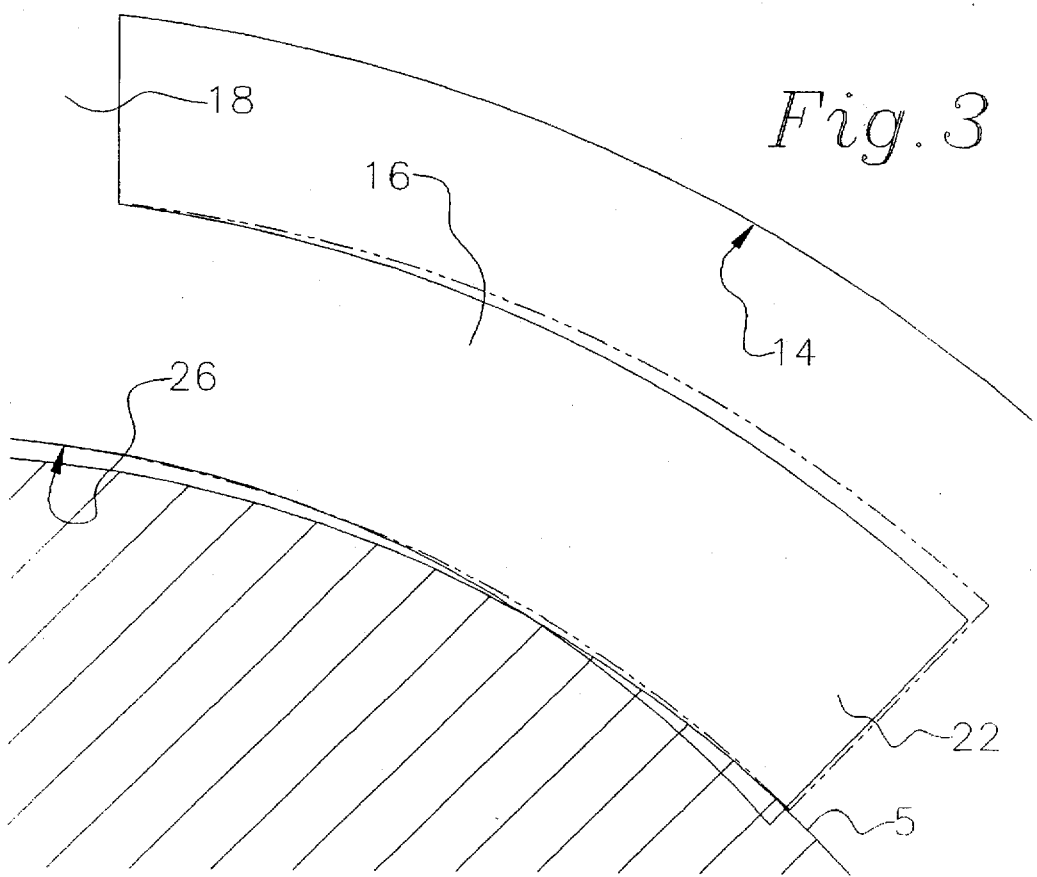
FIG. 3 is an enlarged partial end view of a bearing formed in accordance with the present invention showing a portion of a bearing pad in both solid and phantom line to illustrate deflection thereof upon insertion of a shaft.

As best shown in FIG. 3, when shaft 5 is inserted within shaft opening 20, tip portions 22 are forced to deflect toward inner wall 14 to a position represented by phantom line to accommodate the shaft. Bearing 10, and more critically bearing pads 16, are formed of a material exhibiting elastic deformation over the range of deflection necessitated by shaft 5. Consequently, deflected tip portions 22 are biased to exert a static preload on shaft 5, thereby providing a zero clearance fit and aligning a central axis 6 of shaft 5 with a central axis of bearing 10. As the tip portions 22 become worn due to axially directed travel along shaft 5 and/or rotational motion about central axis 6, their preloaded condition will serve to maintain the zero clearance fit and axial alignment between shaft 5 and bearing 10 by urging the tip portions for continued engagement with the shaft. The biasing characteristics of tip portions 22 will of course be influenced by several factors, including effective length and thickness of the tip portions.

In a preferred embodiment of the present invention, three bearing pads 16 are provided and an inner pad surface 26 of each bearing pad 16 is arcuate in profile. As illustrated in FIG. 4A, respective mid points 28 on pad surfaces 26 are associated with mid portions 24 and define a circle of a first diameter D1 greater than the diameter of shaft 5. Furthermore, as shown in FIG. 4B, respective lateral points 30 on pad surfaces 26 are associated with tip portions 22 and define another circle of a second diameter D2 less than the diameter of shaft 5. The arcuate profile of each pad surface 26 is therefore determined by the two corresponding lateral points 30 along with corresponding mid point 28. By configuring bearing 10 in this manner, a pair of plug gauges 32 and 34 respectively corresponding in diameter to D1 and D2 may be used to check bearing 10 for conformance with design tolerances. Where plug gauge 32 is used to check mid points 28, bearing pads 16 should be formed of a material exhibiting elastic deformation over the range of deflection caused by insertion of the plug gauge into shaft opening 20.

Fingers 18 are spaced circumferentially to extend from inner wall 14 and cooperate therewith to form a plurality of lubricant channels 36 about shaft 5 and communicating therewith via gaps 38 between individual bearing pads 16.

The bearing of the present invention is particularly suited for precision applications involving predominantly axial motion, for instance supporting a zoom lens carrier of a microscope for travel along a guide rod. It is presently preferred to manufacture bearing 10 as an integral unit from an ABS copolymer by laser cutting or injection molding, however other materials and manufacturing methods are possible, depending on the particular application and dimensional requirements of bearing 10.

The bearing of the present invention is a cost effective alternative to prior art bearings and provides stable axial and rotational motion of a load relative to a shaft. It is recognized that various bearing configurations falling within the scope of the present invention, however differing from the preferred embodiment described herein, may be employed to suit particular applications. The scope of the present invention is measured by the claims below.

What is claimed is:

1. A bearing for supporting a load for axial and rotational motion relative to a cylindrical shaft having a central axis, said bearing comprising:

an outer shell having a cylindrical inner wall;

a plurality of circumferentially spaced bearing pads connected to said inner wall for engaging said shaft, each said bearing pad having a pair of elastically deformable lateral tip portions and a mid portion intermediate said tip portions;

said tip portions of each of said plurality of pads being arranged for interference fit with said shaft prior to mating of said shaft within said bearing, said tip portions of each of said plurality of pads flexing to receive said shaft in mating engagement and thereby exerting a static preload on said shaft; and said mid portions of each of said plurality of pads being arranged for clearance fit with said shaft prior to mating of said shaft within said bearing.

2. The bearing according to claim 1, wherein said plurality of bearing pads is three bearing pads.

3. The bearing according to claim 1, wherein said mid portions of said bearing pads define a circle of a first diameter greater than a diameter of said shaft and said tip portions of said bearing pads define a circle of a second diameter less than said diameter of said shaft.

4. The bearing according to claim 1, wherein said bearing pads include an inner pad surface having an arcuate profile.

5. The bearing according to claim 1, wherein each of said plurality of bearing pads is connected to said inner wall by a finger extending radially from said inner wall to said mid portion of said bearing pad.

6. The bearing according to claim 5, wherein said fingers are circumferentially spaced and cooperate with said inner wall to form a plurality of lubricant channels about said shaft in communication therewith.

7. The bearing according to claim 1, wherein said bearing is formed as an integral unit.

* * * * *